United States Patent [19]

Jopson

[11] Patent Number: 5,734,493
[45] Date of Patent: Mar. 31, 1998

[54] OPTICAL FREQUENCY CONVERSION DEVICE

[75] Inventor: Robert Meachem Jopson, Rumson, N.J.

[73] Assignee: Lucent Technologies Inc., Murray Hill, N.J.

[21] Appl. No.: 742,712

[22] Filed: Nov. 1, 1996

[51] Int. Cl.$^6$ .................................. G02F 1/09; G02F 1/11
[52] U.S. Cl. ........................ 359/326; 359/280; 359/285
[58] Field of Search ................................. 359/280, 284, 359/285, 286, 287, 305, 307, 326, 327–332

[56] References Cited

U.S. PATENT DOCUMENTS

| | | | |
|---|---|---|---|
| 5,101,291 | 3/1992 | Jopson | 359/124 |
| 5,166,822 | 11/1992 | Priatko et al. | 359/287 |
| 5,177,633 | 1/1993 | Wong | 359/330 |
| 5,233,462 | 8/1993 | Wong | 359/330 |

OTHER PUBLICATIONS

Chen S. Tsai, Recent Advances in Guided–Wave Magnetooptic Interactions, Devices, and Applications; vol. 1, No. 1, 1993, *Photonics and Optoelectronics*, pp. 51–66 (No month).

Y. Pu and C.S. Tsai, Wideband electronically tunable integrated magneto–optic frequency shifter at X band; Jun. 28, 1993; 1993 American Institute of Physics; pp. 3420–3422, *Appl. Phys. Lett.*

C.L. Wang et al., Permanent Magnet–Based Guided–Wave Magnetooptic Bragg Cell Modules; vol. 10, No. 5, May 1992; *Journal Of Lightwave Technology*, pp. 644–648.

*Primary Examiner*—John D. Lee

[57] ABSTRACT

A device for converting the frequency of an optical signal to form a frequency comb having a plurality of frequency spaced optical carriers. In one embodiment, a magnetooptic frequency conversion device is disclosed wherein the frequency of the optical signal is shifted by the frequency of an AC signal generating a magnetic field through a crystal. In another embodiment, acoustooptic scattering is used wherein an acoustic wave is provided to a waveguide which receives an optical signal so that the frequency of the optical signal is shifted by the frequency of the acoustic wave. In yet another embodiment, a single sideband modulator is used to shift the frequency of an optical signal.

6 Claims, 3 Drawing Sheets

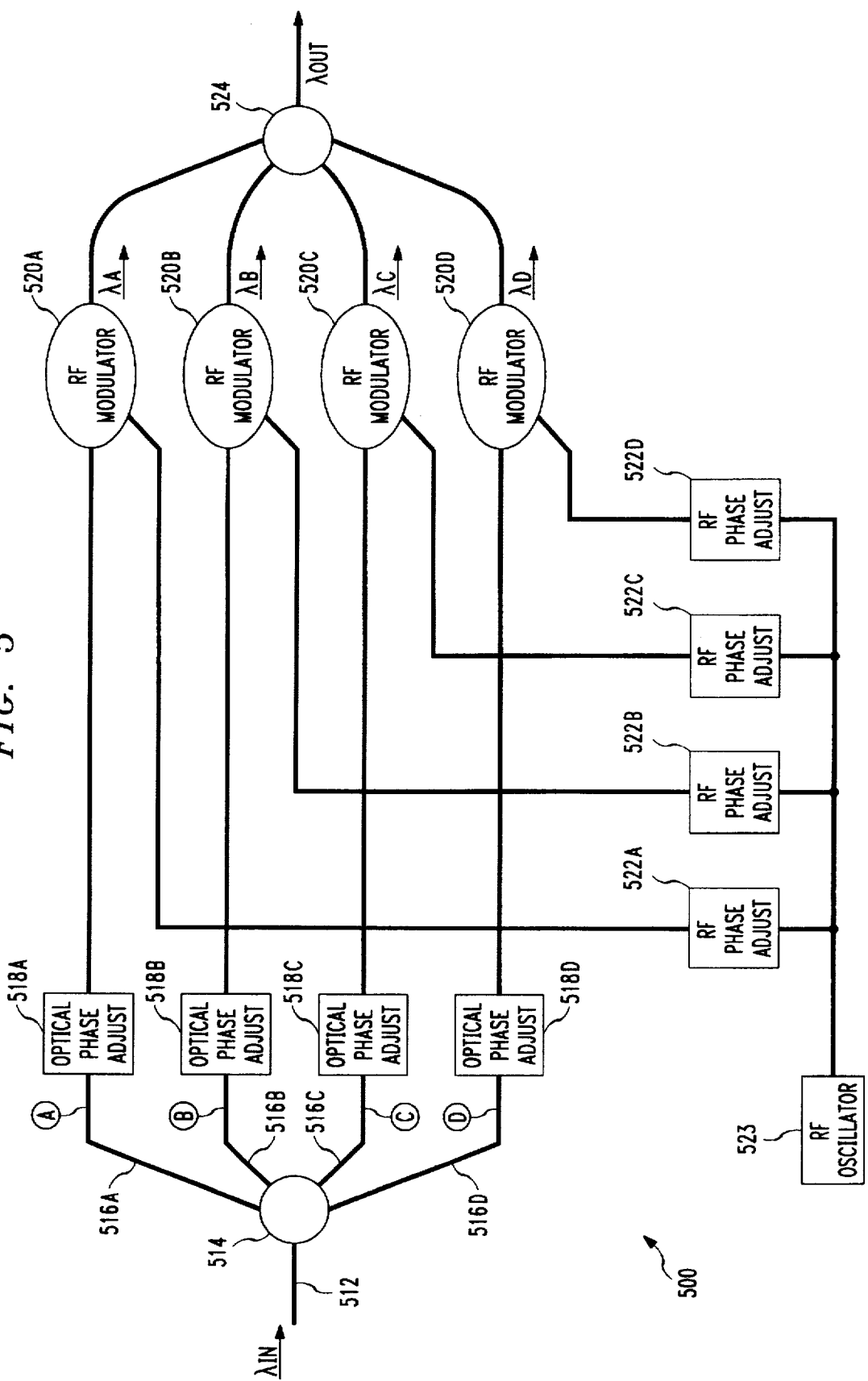

2

OPTICAL FREQUENCY CONVERSION DEVICE

BACKGROUND OF THE INVENTION

I. Field of the Invention

The present invention is related to an optical circuit for use in an optical communications network. More particularly, the present invention pertains to a frequency conversion device for shifting optical frequencies in an optical circulating loop to form a comb of discrete optical frequency carriers.

II. Background of Invention

In U.S. Pat. No. 5,101,291, a recirculating loop or optical circuit is disclosed for generating an optical frequency comb from an optical input signal. The optical frequency comb is comprised of a plurality of discrete and temporally spaced optical carriers or channels which can be used in a variety of applications such as for data modulation and transmission in fiber optic communications systems.

With reference to FIG. 1, a schematic representation of a prior art frequency shift device 10 for use in an optical circuit is there depicted. As shown, the frequency shift device includes an optical isolator 30 which receives as an input signal an optical output 20 from a laser source 12. The optical isolator 30 provides the optical output 20 to a terminal of a directional coupler 35 which couples the optical signal to an optical fiber 55. The optical signal 20 is carried by the optical fiber 55 to an optical amplifier 70 for amplifying the optical signal and providing it to an acoustic wave modulated Bragg cell 140 for generating an optical frequency comb 170. The generated frequency comb is provided to the directional coupler 35 and output on an output port 45. Optical coupler 35 couples the incoming optical signal 20 to optical fiber 55 and also couples the optical frequency comb 170 to the output port 45, thus permitting simultaneous ingress and egress of optical signal 20 and optical frequency comb 170, respectively. In addition, optical isolator 30 provides for uni-directional flow of the optical signal. In other words, optical isolator 30 will prevent optical signal 20 and optical frequency comb 170 from flowing back to laser 12.

As explained more fully in U.S. Pat. No. 5,101,291, the entire disclosure of which is hereby incorporated by reference, the output 110 of optical amplifier 70, which includes the amplified optical signal 20, is fed to a lens 120 which collimates the divergence of the amplified optical signal to match the entrance aperture of the Bragg cell 140. The incoming signal 110 to the Bragg cell 140 is shifted by a frequency ($f_a$) which corresponds to the frequency of the acoustic wave traversing the Bragg cell. As is known in the art, light incident on a sound wave passing through a Bragg cell—the soundwave consisting of sinusoidal perturbations of the density of the propagating medium travelling at a sound velocity (v) and acoustic frequency ($f_a$)—causes a change in the index of refraction of the Bragg cell that causes the incident light beam to be diffracted at a particular angle and also shifts the frequency of the incident beam. Thus, each time that optical signal 110 passes through Bragg cell 140, it is frequency shifted by the acoustic wave frequency $f_a$.

To effectuate continuous flow of the optical signal 110 through the Bragg cell, amplifier 70 contains a reflector (not shown) which, in conjunction with a reflector 160 positioned at the output of Bragg cell 140, continuously reflects the optical signal through the Bragg cell to form the optical frequency comb 170. Thus, with each double pass of the optical signal 110 through the Bragg cell, the frequency of the optical signal is shifted (upward or downward) by twice the acoustic frequency driving the Bragg cell.

The above-described prior art system generates an optical comb comprised of frequency spaced optical carriers which are formed by numerous reflections through Bragg cell 140—having an acoustic wave propagating therethrough—between the optical amplifier reflector and mirror reflector 160. The drawback of such a system, however, is that the frequency separation between adjacent "teeth" in the optical comb is limited by the material properties of the Bragg cell through which the amplified optical signal 110 passes and this renders such a system impractical for comb spacings in the gigahertz range. Thus, it is desirable to generate multiple optical carriers utilizing frequency shift devices other than acoustooptic scattering through a Bragg cell. Moreover, the Bragg cell is not easily coupled to an optical fiber, thus requiring beam focussing elements and/or couplers to connect the optical frequency comb to an optical fiber for transmission through a fiber optic network.

SUMMARY OF THE INVENTION

The deficiencies of the prior art are addressed herein by an optical circuit containing alternative mechanisms different from acoustooptic scattering through a Bragg cell as described in U.S. Pat. No. 5,101,291, for generating an optical frequency comb. The inventive optical frequency conversion device includes an optical loop circuit containing an optical coupler for connecting an incoming optical signal to a loop fiber and for providing a generated optical frequency comb to an output port. The loop fiber provides an incoming optical signal to a frequency shift device which, for each pass of the incoming optical signal therethrough, shifts the frequency of the incoming signal to generate an optical comb.

One of the mechanisms employed for generating an optical frequency shift is a magnetooptic scattering device wherein an optical signal is provided to a magnetooptic Bragg cell having an alternating magnetic field propagating therethrough which is generated by applying an AC current to a substrate having magnetic properties. The frequency of the optical signal is shifted by the frequency of the AC current.

In an alternative embodiment, acoustooptic scattering through a waveguide is performed wherein an acoustic wave is provided to a waveguide in a particular direction and an optical signal is provided to the waveguide in the same direction as the acoustic wave. The frequency of the optical signal is shifted by the frequency of the acoustic wave.

In another alternative embodiment for generating an optical frequency comb, a single sideband RF modulating apparatus is disclosed. The apparatus divides the optical signal into several branches, with each branch containing an optical signal phase adjust mechanism and an RF modulator with an RF phase adjust mechanism. Each portion of the phase adjusted optical signal in each branch is modulated with an RF frequency and the modulated portions are then combined to form a combined signal so that a sideband, which is a frequency shifted replica of the incoming signal, remains. The remaining sideband or output signal is then fed back to the sideband modulating apparatus so that an optical frequency comb is formed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views:

FIG. 5 is a single sideband modulation frequency shift device for use in the circuit of FIG. 2, in accordance with another embodiment of the present invention.

DETAILED DESCRIPTION OF THE PRESENTLY PREFERRED EMBODIMENTS

Figure 1:
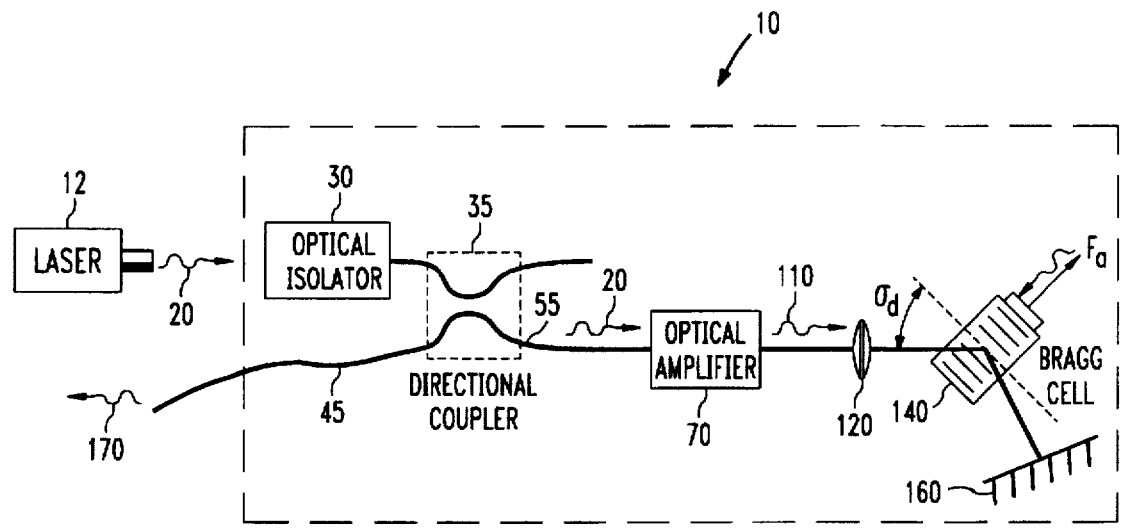
FIG. 1 is a schematic representation of a prior art frequency shift device.
Figure 2:
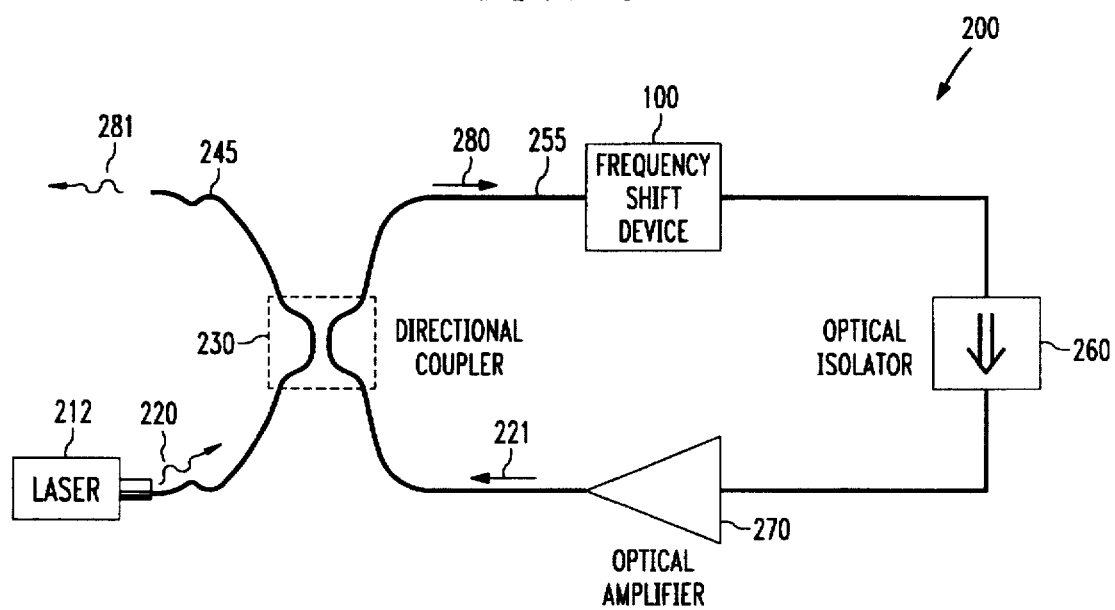
FIG. 2 is a schematic representation of an optical circuit incorporating a frequency shift device in accordance with the present invention.

Turning now to the drawings and initially to FIG. 2, an inventive optical circuit 200 in accordance with the present invention is there depicted. As shown, an optical signal 220 having a particular frequency is output from a laser 212 and provided to an input port of a directional coupler 230 for combining with an optical frequency comb 280 and coupling the combined signal to an optical fiber 255 in a manner well known to those having ordinary skill in the art. The directional coupler 230 also provides an output optical comb signal 281—which may be equal to optical frequency comb 280 depending on the coupling ratio of directional coupler 230—to an output port 244. Like optical frequency comb 280, output optical comb 281 is comprised of a plurality of frequency spaced discrete optical carriers. Optical frequency comb 280 is carried, via fiber 255, to a frequency shift device which, as described more fully below, provides a shift to the frequencies of the comb each time the comb is provided thereto. For example, at time t=0, the only optical signal in the circuit 200 is signal 220 which is frequency shifted by device 100 and amplified by optical amplifier 270. The resulting signal 221, which is a frequency shifted replica of signal 220, is provided to output port 245 and is also coupled with incoming optical signal 220 so that, during the next pass through the circuit 200, both signals (220 and 221) and, hence, both frequencies, are shifted. Thus, after a lapse of time, the optical frequency comb 280 is formed having a plurality of optical carriers or channels, e.g. spaced frequencies, which are temporally separated from each other. The number of frequencies or channels in the comb may be limited by the frequency response of the circuit 200 such as by the optical amplifier 270 or a filter (not shown). The temporal spacing between adjacent channels in the comb results from the length of time or delay caused by the optical signal traversing the circuit 200.

With continued reference to FIG. 2, the circuit 200 also includes an optical isolator 260 which directs the flow of the optical signal carried by the circuit 200 in a particular direction, e.g. the clockwise direction as shown in the figure. An optical amplifier 270 is also included for amplifying the optical signal carried by the circuit 200 to account for signal loss that occurs. As discussed in U.S. Pat. No. 5,101,291, a suitable optical amplifier is a semiconductor optical amplifier or an Erbium-doped optical amplifier, both of which are well known to those having ordinary skill in the art.

Figure 3:
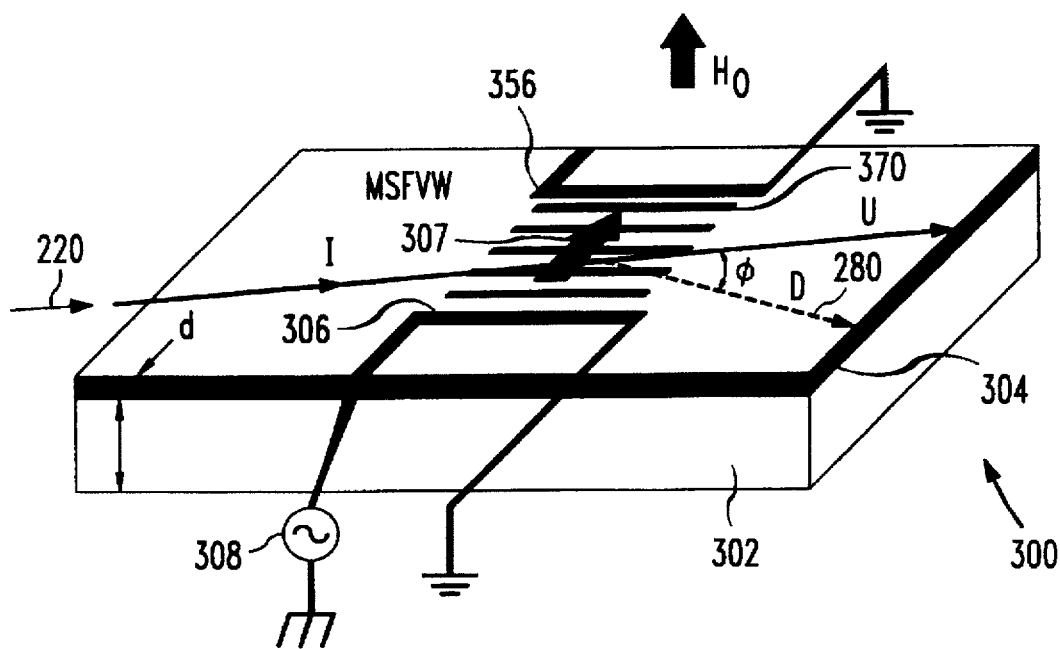
FIG. 3 is a magnetooptic frequency shift device for use in the circuit of FIG. 2.

Referring now to FIG. 3, a frequency shift device 300 for use in the circuit 200 of FIG. 2 for generating an optical frequency comb is depicted. The frequency shift device 300 uses magnetooptic scattering for shifting the frequency of an optical signal 280. The basic principles of magnetooptic scattering are more fully discussed in Wang, C. L. et al., *Permanent Magnet-Based Guided-Wave Magnetooptic Bragg Cell Modules, Journal of Lightwave Technology*, v. 10, No. 5, May, 1992. In general, magnetooptic scattering is performed by generating an alternating magnetic field or spin wave through a crystal which exhibits magnetic properties, and then sending an optical signal therethrough. The magnetic field is generated by an AC current connected to the crystal and the frequency of the optical signal is shifted by the frequency of the AC current.

As shown in FIG. 3, magnetooptic scattering of an optical signal may be performed by device 300 which is a Magnetostatic Forward Volume Wave (MSFVW) based magnetooptic Bragg cell, wherein the Bragg cell is formed from a crystalline material 304—exhibiting magnetic properties—which is formed on a substrate 302. In the preferred embodiment, crystal 304 is formed from gadolinium gallium garnet (GGG) having an upper layer of bismuth-doped yitrium iron garnet (YIG). A means (not shown) is provided for generating a constant magnetic field, shown in the direction of arrow $H_o$. Microstrips 306 and 356 formed on the crystal 304 provide an interface between the crystal and an AC current or voltage source 308 so that an AC current may be injected or applied thereto. As is known in the art, the AC current flowing through the microstrip 306 generates alternating magnetization which propagates away from microstrip 306 at a material dependent velocity and which forms, in the region between microstrips 306 and 356, a moving alternating magnetization grating or spin wave 370 which travels in the direction indicated by arrow 307.

With continued reference to FIG. 3, the incident optical signal 280 is deflected by the spin wave 370 by an angle of φ with respect to the path that the optical signal would have taken absent the magnetic field, and signal 280 is also shifted in frequency by an amount equal to the frequency of the AC current flowing through the device 300. The deflected and frequency shifted optical signal (D) is shown as 281. As discussed hereinabove, the frequency shifted optical signal 221 can then be amplified by the optical amplifier 270 (in FIG. 2) and fed back to device 300 for forming an output optical frequency comb 281.

Figure 4:
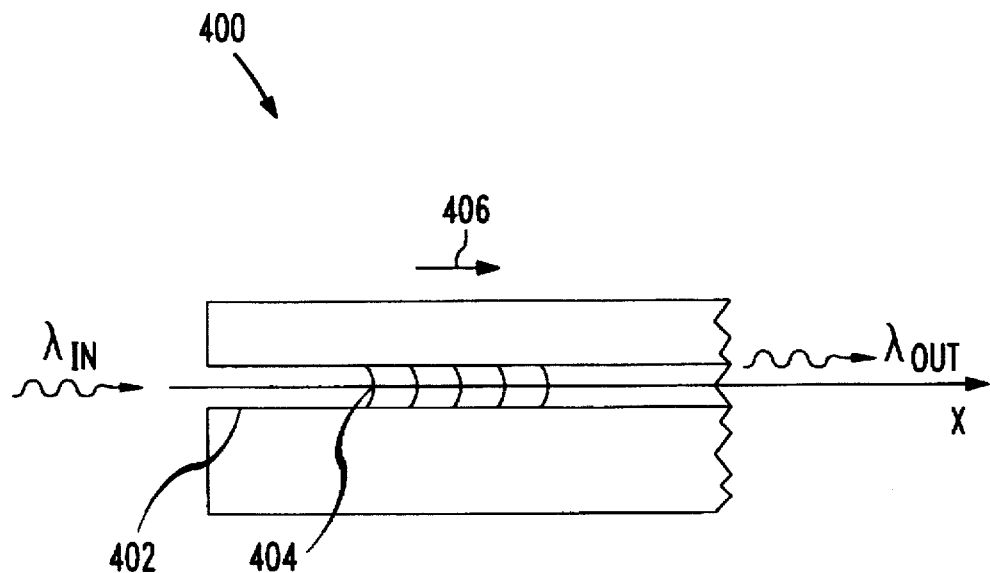
FIG. 4 is an acoustooptic waveguide frequency shift device for use in the circuit of FIG. 2.

Referring now to FIG. 4, an acoustooptic scattering apparatus 400 for shifting the frequency of an incoming optical signal is depicted. As shown, an optical waveguide 402 has an acoustic wave 404 having an acoustic frequency propagating therethrough in a direction indicated by arrow 406. As is known in the art, optical waveguides display polarization characteristics which are represented by the transverse electric (TE) and transverse magnetic (TM) waveguide modes. Light entering a waveguide can be polarized in the TE or TM modes or some combination thereof.

By selecting the wavelength of the acoustic wave 404 to be substantially equal to the waveguide mode beating period—defined as $2\pi$ times the reciprocal of the difference in the wavelengths of the TE and TM modes—an incoming optical signal $\lambda_{in}$ in a pure TE or TM mode will exit waveguide 402 (shown as $\lambda_{out}$) with a polarization orientation orthogonal to that of the incoming optical signal $\lambda_{in}$. The exiting signal $\lambda_{out}$ is also frequency shifted by an amount equal to the acoustic frequency of the acoustic wave 404.

For example, if $\lambda_{in}$ has a wavelength in the range of 1.3–1.5 microns, and the frequency of the acoustic wave is approximately 200 kHz, then $\lambda_{out}$ will be shifted (upward or downward) by 200 kHz. Thus, when device 400 is incorporated as the frequency shift device in circuit 200 of FIG. 2, the shifted output signal $\lambda_{out}$ will be fed back to device 400 for forming an optical frequency comb. In addition, inasmuch as $\lambda_{out}$ consists of substantially linearly polarized light when $\lambda_{in}$ is either TE or TM, the output of waveguide 402 can be filtered, as is known in the art, to provide for isolation, e.g. to obtain only the horizontally polarized components.

Aside from utilizing magnetooptic scattering principles and acoustooptic scattering principles for shifting the frequency of an optical signal as set forth above, optical signal frequencies can also be shifted by modulation techniques and, in particular, by single sideband modulation which is discussed more fully in Izutsu et al., *Integrated Optical Single Sideband Modulator/Frequency Shifter*, J. Quant. Electron. QE-17, 2225, 1981. In general, single sideband modulation can occur when multiple optical signals are mixed with or modulated by an RF signal and then combined with phases adjusted so that all but one of the generated tones or sidebands are cancelled. As is known in the art, when an optical signal is modulated by an RF tone, each of the resulting sidebands is a duplicate of the input optical signal except that the frequency associated with each sideband is shifted (upward and downward) by an amount equal to a multiple of the RF frequency. In addition, the power associated with the input signal is distributed over the resulting sidebands. By using phase modulation and adjusting the phase of the optical signal and the phase of the RF signal, the phase relationships between the sidebands can be adjusted. By proper adjustment of the phase relationships, all sidebands except for a selected band (e.g. the lower sideband) can be removed or cancelled out. When the resulting sideband is then fed back into a single sideband modulator, it will be shifted again. By using the optical circuit 200 of FIG. 2 to combine the resulting sideband with an input signal, an optical frequency comb will be generated having carrier components spaced apart by the RF frequency. An arrangement 500 for performing single sideband modulation on an optical signal is depicted in FIG. 5.

As shown, an optical signal $\lambda_{in}$ is input to an input optical fiber 512 connected to a splitter 514. The splitter 514 divides the optical signal $\lambda_{in}$ into equal portions and provides each portion to a respective optical fiber branch 516A–516D. Each branch 516 contains an optical phase adjust circuit 518 for adjusting the phase angle of $\lambda_{in}$ in a manner well known to those having ordinary skill in the art.

The output of each optical phase adjust circuit 518 is provided to a respective RF phase modulator 520 for modulating the phase adjusted optical signal with an RF signal having an associated modulation frequency. Each RF modulator 520A–520D modulates the phase adjusted optical signal in its respective branch 516 with the same RF frequency provided by an RF oscillator 523. However, the phase angle of the RF signal provided to each RF modulator can be separately adjusted for each branch 516 via an RF phase adjust circuit 522. In other words, RF phase adjust circuit 522A will adjust the phase of the RF signal applied to branch 516A via RF modulator 520A, and RF phase adjust circuit 522D will adjust the phase angle of the RF signal applied to branch 516D via RF modulator 520D. The resulting optical signals ($\lambda_A$–$\lambda_D$) will each contain sidebands separated by the frequency of the RF signal with phase relationships determined by the corresponding optical phase adjust 518 and the corresponding RF phase adjust 522. The modulated optical signals $\lambda_A$–$\lambda_D$ are then recombined by a combiner 524 to form an output optical signal $\lambda_{out}$.

By adjusting the phase angle of the incoming optical signal $\lambda_{in}$ via optical phase adjust circuits 518, and by adjusting the phase angle of the RF signal via RF phase adjust circuits 522, the optical signals or components $\lambda_A$–$\lambda_D$ can be combined in a particular manner so that only a desired component results e.g. a single sideband, having a frequency different than the frequency of $\lambda_{in}$ by an amount equal to the RF signal frequency.

As is known in the art, phase modulating a signal with an RF signal will form upper and lower sidebands at frequencies equal to the sums and differences of the frequency of the incoming signal and integer multiples of the RF frequency. Thus, for example, when an optical frequency is modulated by an RF modulator, upper and lower sidebands, as well as the carrier band, result. If the phase angles of the optical signal and the RF frequency are properly selected, then the summation of the resulting separate portions will substantially result in a single sideband which is frequency shifted by the RF frequency.

As an example, if the optical phase adjust and the RF phase adjust for branch 516A are set at 0°, the optical phase adjust and RF phase adjust for branch 516B are set for 90°, the optical phase adjust and the RF phase adjust for branch 516C are set for 180° and the optical phase adjust and RF phase adjust for branch 516D are set for 270°, then the addition of the resulting optical signals ($\lambda_A$–$\lambda_D$) via the optical combiner 524 will cause the carriers and the upper sidebands which have opposite phases to cancel out thus leaving the lower sideband and higher order sidebands. Since the higher order sidebands can be arranged to have low amplitude so that their presence is insignificant, a single sideband will result having a frequency equal to the difference between the frequency of the incoming optical signal $\lambda_{in}$ and the RF signal frequency. It will be appreciated by those having ordinary skill in the art that other optical phase and RF phase angles can be selected to effectuate the cancellation of undesired sidebands to achieve the results set forth hereinabove. For example, the phase adjustment of the RF signal can be accomplished by adjusting the length of the transmission line carrying the RF signal from the RF oscillator 523 to the RF phase modulators 520. It will also be appreciated by those having ordinary skill in the art that sideband cancellation can occur by dividing the input optical signal $\lambda_{in}$ into more or fewer branches than the four branches depicted in FIG. 5 so long as the desired result is achieved, i.e. a substantially single remaining sideband having a frequency shift equal to the sum or difference of the incoming optical signal and the RF frequency signal. For example, a two branch system can be used wherein one RF modulator modulates the amplitude of the optical signal portion in one branch and another RF modulator modulates the phase of the optical signal portion in the other branch.

As has now been demonstrated and explained hereinabove, an optical frequency comb comprising a plurality of frequency spaced optical carriers can be generated by employing a frequency shift mechanism in the optical circuit 200 of FIG. 2. The frequency shift mechanism can employ (1) magnetooptic scattering principles to achieve an optical comb having relatively high frequencies (e.g. greater than about 10 GHz), (2) acoustooptic scattering principles in conjunction with a waveguide to achieve an optical comb having frequencies less than about 10 GHz, and (3) single sideband modulation principles to achieve an optical frequency comb having a broad range of frequencies. The optical carriers in the optical comb can be employed for a variety of uses such as for frequency shifting data modulation carriers for transmission in an optical communications network.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. An optical apparatus for generating an optical frequency comb having a plurality of optical carrier frequencies each spaced apart from another by an offset frequency, said optical apparatus comprising:

means for frequency translating an input optical signal having a first optical carrier frequency to an output optical signal having a second optical carrier frequency, said frequency translating means comprising a Bragg cell having a magnetic field propagating therethrough generated by an AC signal having an AC frequency, and wherein the second optical carrier frequency is one of the sum and difference of the first optical carrier frequency and said AC signal frequency;

means for optically amplifying said output optical signal to define an amplified output optical signal; and means for optically recirculating a portion of said amplified output optical signal to said means for frequency translating as a recirculated input optical signal so that with repeated transits through said means for frequency translating, said recirculated input optical signal is both frequency translated and optically amplified to thereby generate an optical frequency comb.

2. The optical apparatus of claim 1, wherein said Bragg cell comprises a substrate having a waveguide formed thereon to which the optical signal is applied, and having a conductor to which the AC signal is applied, for generating a magnetic field through said substrate and said waveguide.

3. The optical apparatus of claim 2, wherein said substrate is comprised of gadolinium gallium garnet, wherein said waveguide is comprised of yttrium iron garnet, and wherein said conductor comprises microstripping.

4. An optical apparatus for generating an optical frequency comb having a plurality of optical carrier frequencies each spaced apart from another by an offset frequency, said optical apparatus comprising:

means for frequency translating an input optical signal having a first optical carrier frequency to an output optical signal having a second optical carrier frequency, said frequency translating means comprising a waveguide having a length, an input port and an output port, said waveguide having an acoustic signal propagating therethrough in a direction substantially parallel to the waveguide length at an acoustic frequency and receiving said input optical signal at said input port and outputting said output optical signal from said output port, and wherein the second optical carrier frequency is one of the sum and difference of the first optical carrier frequency and said acoustic frequency;

means for optically amplifying said output optical signal to define an amplified output optical signal; and means for optically recirculating a portion of said amplified output optical signal to said frequency translating means as a recirculated input optical signal so that with repeated transits through said means for frequency translating, said recirculated input optical signal is both frequency translated and optically amplified to thereby generate an optical frequency comb.

5. An optical apparatus for generating an optical frequency comb having a plurality of optical carrier frequencies each spaced apart from another by an offset frequency, said optical apparatus comprising:

a single sideband modulator for frequency translating an input optical signal having a first optical carrier frequency to an output optical signal having a second optical carrier frequency;

means for optically amplifying said output optical signal to define an amplified output optical signal; and means for optically recirculating a portion of said amplified output optical signal to said frequency translating means as a recirculated input optical signal so that with repeated transits through said means for frequency translating, said recirculated input optical signal is both frequency translated and optically amplified to thereby generate an optical frequency comb.

6. The optical apparatus of claim 5, wherein said single sideband modulator comprises:

means for dividing the input optical signal into identical first and second portions;

a first branch connected to said dividing means for receiving said first portion;

a second branch connected to said dividing means for receiving said second portion;

first optical phase adjust means connected to said first branch for adjusting the phase of the first portion to generate a phase adjusted first portion;

second optical phase adjust means connected to said second branch for adjusting the phase of the second portion to generate a phase adjusted second portion;

a first RF modulator connected to said first optical phase adjust means for modulating the phase adjusted first portion with an RF signal having a frequency and a phase angle;

a second RF modulator connected to said second optical phase adjust means for modulating the phase adjusted second portion with said RF signal;

means connected to said first and second RF modulators for separately adjusting the phase angle of the RF signal applied to said first and second branches; and means for combining the RF modulated first and second portions to form the output optical signal.

* * * * *